(12) United States Patent
Bow

(10) Patent No.: US 10,226,880 B2
(45) Date of Patent: Mar. 12, 2019

(54) ANTI-KICKBACK DEVICE

(71) Applicant: D. Keith Bow, Corfu, NY (US)

(72) Inventor: D. Keith Bow, Corfu, NY (US)

(*) Notice: Subject to any disclaimer, the term of this patent is extended or adjusted under 35 U.S.C. 154(b) by 130 days.

(21) Appl. No.: 15/073,864

(22) Filed: Mar. 18, 2016

(65) Prior Publication Data

US 2016/0271826 A1    Sep. 22, 2016

Related U.S. Application Data

(60) Provisional application No. 62/182,783, filed on Jun. 22, 2015, provisional application No. 62/134,812, filed on Mar. 18, 2015.

(51) Int. Cl.
| | |
|---|---|
| *B27G 19/02* | (2006.01) |
| *B23D 47/04* | (2006.01) |
| *B27B 29/00* | (2006.01) |
| *B27C 5/06* | (2006.01) |
| *B23Q 3/00* | (2006.01) |

(52) U.S. Cl.
CPC ............ *B27G 19/02* (2013.01); *B23D 47/04* (2013.01); *B23Q 3/002* (2013.01); *B27B 29/00* (2013.01); *B27C 5/06* (2013.01)

(58) Field of Classification Search
CPC .......... B27G 19/02; B23D 47/04; B27C 5/06; B23Q 3/002
See application file for complete search history.

(56) References Cited

U.S. PATENT DOCUMENTS

| | | | |
|---|---|---|---|
| 4,476,757 A | 10/1984 | Morris | |
| 8,763,502 B2 | 7/2014 | Smith | |
| 2003/0140754 A1* | 7/2003 | Kimmel | B23D 47/04 83/447 |
| 2006/0185485 A1* | 8/2006 | Wang | B27B 25/10 83/436.2 |
| 2010/0307302 A1 | 12/2010 | Smith | |
| 2016/0074980 A1* | 3/2016 | Burdick | B23D 47/04 144/250.12 |

OTHER PUBLICATIONS

Kreg True-flex Featherboard Owner's Manual; Kreg Tool Company; 12 pages; Kreg Tool Company, Huxley, Iowa; www.kregtool.com; Feb. 2014.
Milescraft Featherboard OPS Manual; 2 pages; www.milescraft.com; Jul. 2008.

* cited by examiner

*Primary Examiner* — Omar Flores Sanchez
(74) *Attorney, Agent, or Firm* — Duane C. Basch; Basch & Nickerson LLP

(57) ABSTRACT

An anti-kickback device is disclosed where the device includes a plurality of flexible members, and at least a compliant contact surface in contact with a moving workpiece, where the flexible members provide a biasing force against the workpiece and also resist or prevent kickback of the workpiece as it engages a tool such as a shaper, saw blade, etc. The configuration of the flexible members assures an opposing force to resist kickback.

12 Claims, 18 Drawing Sheets

ANTI-KICKBACK DEVICE

This application claims priority from U.S. Provisional Patent Application No. 62/134,812 for a FEATHERBOARD WITH LIVING HINGES, filed Mar. 18, 2015 by Ronald and Keith Bow, and from U.S. Provisional Patent Application No. 62/182,783 for a FEATHERBOARD WITH FRICTION-INCREASING MATERIAL, filed Jun. 22, 2015 by Ronald and Keith Bow, both of which are hereby incorporated by reference in their entirety.

The disclosed embodiments generally relate to a device having the capability of biasing a workpiece against a work surface such as a fence or table and limiting the potential for the workpiece to move in the direction of the cutting tool. Specifically, an accessory apparatus used for guiding a workpiece into a blade or similar cutting tool and resisting any kick-back of the workpiece while it is being worked on. In one embodiment, the apparatus includes a plurality of curved members attached to a body via a living hinge.

BACKGROUND AND SUMMARY

Anti-kickback devices are known to be used with a work table or similar work surface, such as a table saw or shaper, to safely guide a workpiece along the table as it is processed by a cutting implement, such as a saw blade, shaper or other tool bit. Typically featherboards are mounted on, or attached to, a worktable, a guide fence or both, and adjusted to a desired position to accommodate the width (and possibly the height) of the stock to be cut. However, a feather board may be severely limited in the amount of sideward pressure that can be applied, while still allowing the workpiece to be fed between the feather board and the guide fence. Such practical limitations also limit the amount of resistance that can be exerted on the workpiece. Accordingly, there exists a need for an anti-kickback device capable of easy set up yet providing a greater opposing force while at the same time maintaining a manageable infeed pressure.

The anti-kickback device embodiments disclosed herein serve to apply a biasing force to the workpiece in order to assure that the workpiece is directed to the tool and that chatter is reduced in the workpiece, as well as provide a safety feature by opposing kickback (reverse feed) forces generated by the cutting tool that tend to thrust the workpiece towards the operator.

In the disclosed embodiments, the anti-kickback device includes a plurality of flexible members designed to extend at an angle to contact and guide at least one surface of the workpiece in a manner such that as the work piece is fed by and in contact with the anti-kickback device(s). As will be appreciated, the anti-kickback device may be configured to contact a workpiece in various positions (e.g., workpiece between the device and a fence, workpiece between the device and a table, etc.) In operation the flexible members are deflected slightly by contact with the workpiece, and as a result exert a force or pressure that encourages the workpiece to remain in alignment with the fence or table as the workpiece passes a tool such as the blade. The tips of the flexible members, formed of a deformable material such as a rigid foam, also partially conform to the surface of the workpiece to assure frictional contact. In the various embodiments described herein, the flexible members extend from a body that is further attached to a support frame or central structure of the device. Because the flexible members are angled in the direction of workpiece movement, should the cutting tool catch the work piece and try to "kick" it rearward, the flexible members self-lock in opposition to the rearward motion of the workpiece.

In one embodiment of the anti-kickback device, the flexible members move in an arcuate manner in response to the rearward movement of the workpiece to strongly oppose rearward motion and the workpiece becomes bound between the device and the fence. In actual practice the members also maintain the workpiece in parallel alignment with the saw blade and guide fence so as to mitigate the potential for jamming of the workpiece and subsequently kicking it back at the operator. As noted above, a further attribute of the disclosed flexible member design is that the compliant material that the base and flexible members are made of creates a living hinge and the flexible members and base further absorb vibrations thereby also decreasing or eliminating chatter of the workpiece and assuring a smooth cut edge of the workpiece.

Disclosed in embodiments herein are anti-kickback devices for use with a work surface, comprising: a body and a plurality of flexible members extending from at least one side of the body, each of said flexible members connected to the body by a living hinge; and at least one mechanism associated with the anti-kickback support frame for adjustably attaching the device to a work surface relative to the workpiece, as well as an adjustment mechanism suitable for securing the device against movement relative to the work surface.

Further disclosed in embodiments herein is an anti-kickback device, comprising: a body and a plurality of compressible flexible members extending from at least one side of the body, wherein the outer shape of each of the plurality of flexible members includes a generally planar surface extending from a first radiused recess adjacent the body, an arcuate surface, terminating at one end thereof in a line intersecting the planar surface, a second radiused recess at an opposite end of the arcuate surface, the second radiused recess having a slot extending therefrom, and a living hinge portion, connecting the flexible member to the body, the living hinge being located between an end of the slot and the first radiused recess; and a mechanism associated with the body for releasably attaching the anti-kickback device to a stationary work surface.

Figure 1A:
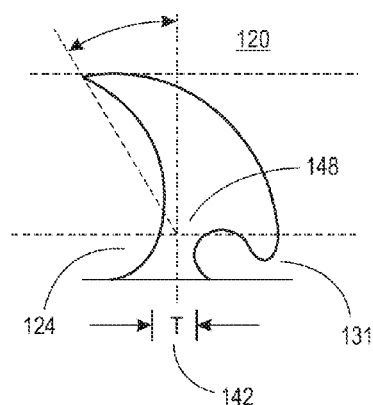
FIGS. 1A-1D are illustrations of the various profiles associated with one of anti-kickback flexible members as a function of operational forces.

The various embodiments described and depicted herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

Figure 1B:
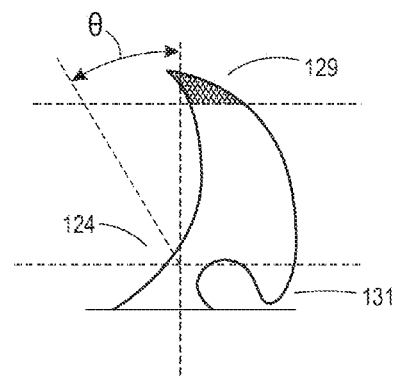
Figure 1C:
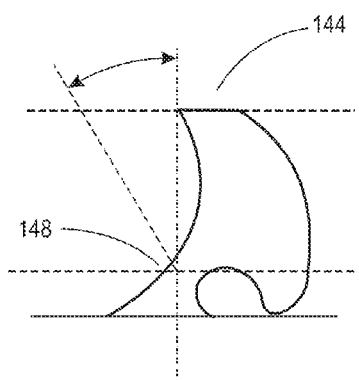

Referring now to the figures, FIGS. 5, 11 and 18-23 illustrate various embodiments of the anti-kickback device. In all cases, however, the device employs a plurality of flexible members or "fingers" that extend from a body or base, and the tips of which remain in conformable contact with at least one surface of a workpiece. For example, depicted in FIG. 1A is a first embodiment of a flexible member 120, in a relaxed or neutral position. Flexible member 120 includes an area having a minimum cross section dimension "T", shown as 142, which provides for a resilient hinge point having a center of rotation 148, as shown in FIG. 1C. Living hinge 124 is as a flex point that comprises a thin bendable region made from the same material as the flexible member and base. The material preferably provides for minimal friction and nominal wear, as well as flexibility to enable the living hinge.

Absent any contact with a workpiece the distal point of flexible member 120 is located at an offset angle theta ($\Theta$) from the Y axis of hinge 124. However, when considering the device in use against a workpiece, flexible member 120 is rotated a radial distance theta ($\Theta$) clockwise about the centroid 148 of living hinge 124 as seen in FIG. 1B, and by virtue of the offset radius is compressed by a rearward force exerted by the workpiece as it is kicked back.

Figure 1D:
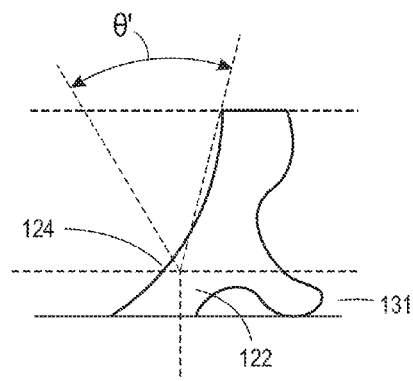
Figure 3:
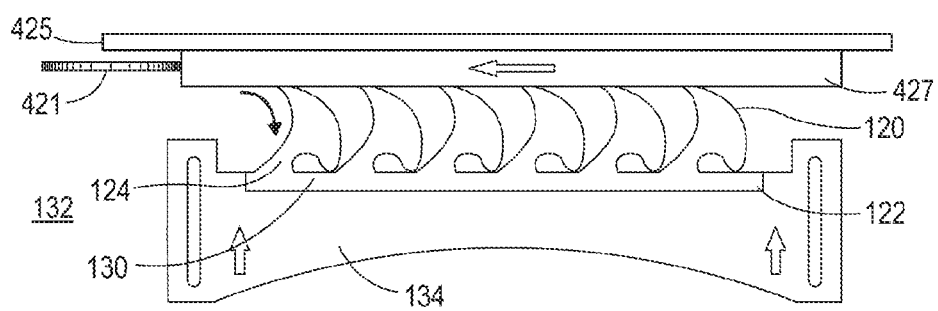
FIG. 3 is an illustrative example of the anti-kickback device flexible members mounted within a support frame in forcible contact with a workpiece.

The living hinge portion 124 comprises, for each member, a reduced cross-section of the material from which body 114 and flexible member 120 are constructed from. In other words, the cross-sectional area of material connecting the flexible member to the body in living hinge region 124, in this embodiment, is smaller than a cross section of other parts of the flexible member. A nose or limiter 131 serves to limit the angular displacement of flexible member 120. This applied pressure through the adjustable mounting of the support frame 134 compresses the distal end region 129 of flexible member 120, as depicted in FIG. 1C and FIG. 3, which in turn increases the contact surface area 144, while providing a compressive static force against the workpiece. Accordingly, flexible member 120 is positioned to react to a rearward motion of the workpiece by resisting the kickback force, whereby the workpiece is essentially jammed between guide fence 425 and the anti-kickback device 100. As illustrated in FIG. 1D, in combination with FIG. 4, flexible member 120, by virtue of rotating clockwise about the offset radius of living hinge 124, takes on a column like configuration as it is further compressed under clockwise rotation initiated by the rearward-moving workpiece. This now semi-rigid member 120 provides a relatively stiff connection between the workpiece and the device applies a considerable counter force that is greater than the reactive kickback force.

Figure 2:
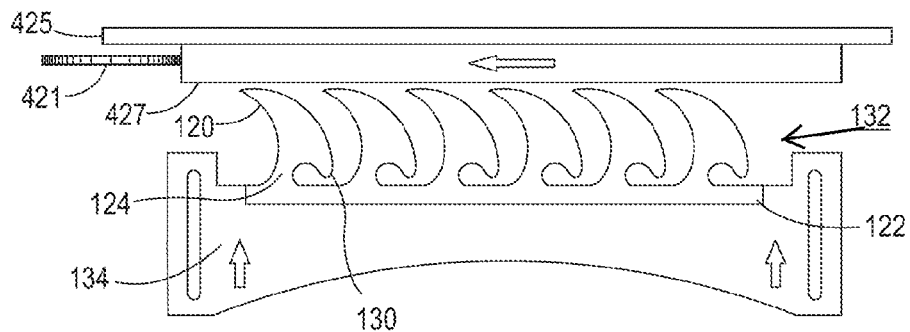
FIG. 2 is an illustrative example of the anti-kickback flexible members mounted within a support frame, absent a workpiece.
Figure 4:
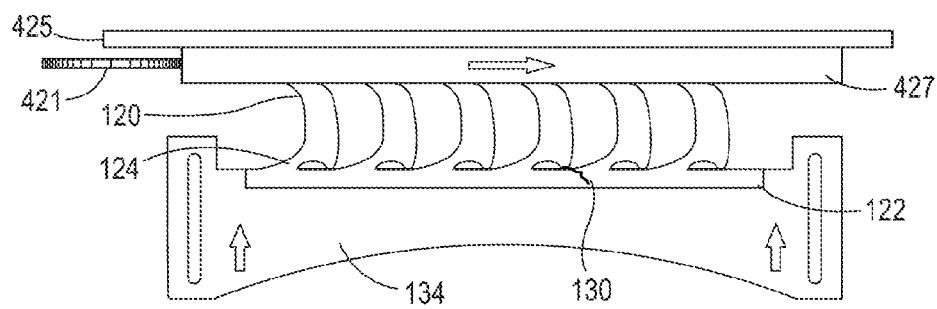
FIG. 4 is an illustrative example of the anti-kickback flexible members mounted within a support frame in an anti-kickback reactive mode.
Figure 24:
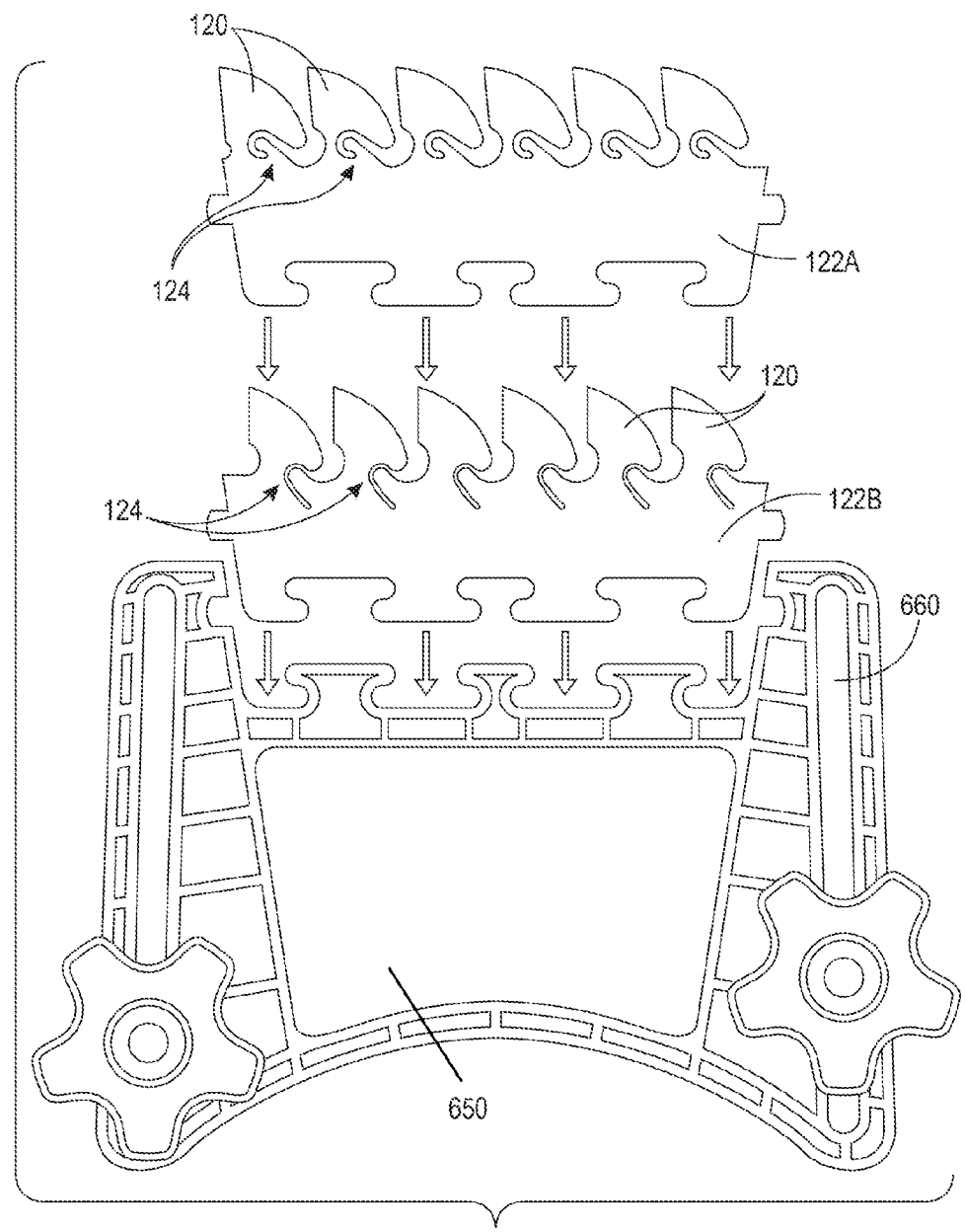
FIG. 24 is an illustration of a kick-back device depicting an embodiment providing replacement body pieces, each having alternative finger configurations.

Turning next to FIGS. 2-4, a plurality of flexible members 120 are arranged into a row, each being attached to a common body 122 by living hinges 124. Flexible member body 132 is removably inserted within support frame 134 to accommodate a variety of flexible member/living hinge profiles to permit varying degrees of kickback control, allow for replacement of worn components, etc. As will be appreciated, different configurations of the flexible members and the material they are made from and/or coated with results in each having its own respective resilience, and performance characteristics. As noted, flexible member body 132 is also replaceable when worn out or damaged. As an example of an embodiment with a support frame and alternative replacement, reference is made to FIG. 24.

FIGS. 2-4 depict several operative states of anti-kickback device 100, (i) standby, (ii) engaged and (iii) reactive kickback mode. In FIG. 3, support frame 134 and flexible members 120 have been positioned against workpiece 427 so as to cause flexible members 120 to provide a nominal lateral force by displacing their distal end and rotating living hinge 124 up to limiter 131. Workpiece 427 is subsequently fed into blade 421 taking the path of least resistance as the flexible members yield to the forward motion. However, in FIG. 4 a reactive force generated by the blade becoming jammed within the cut, causes the workpiece to engage flexible members 120 in a rearward direction, thereby engaging them in an upright semi-rigid state to stop or dampen the kickback, and in so doing protecting the operator from serious injury. In effect, flexible members 120 collectively provide a one-way feed path, or ratchet, for a workpiece being feed into a blade across a work table.

Figure 5:
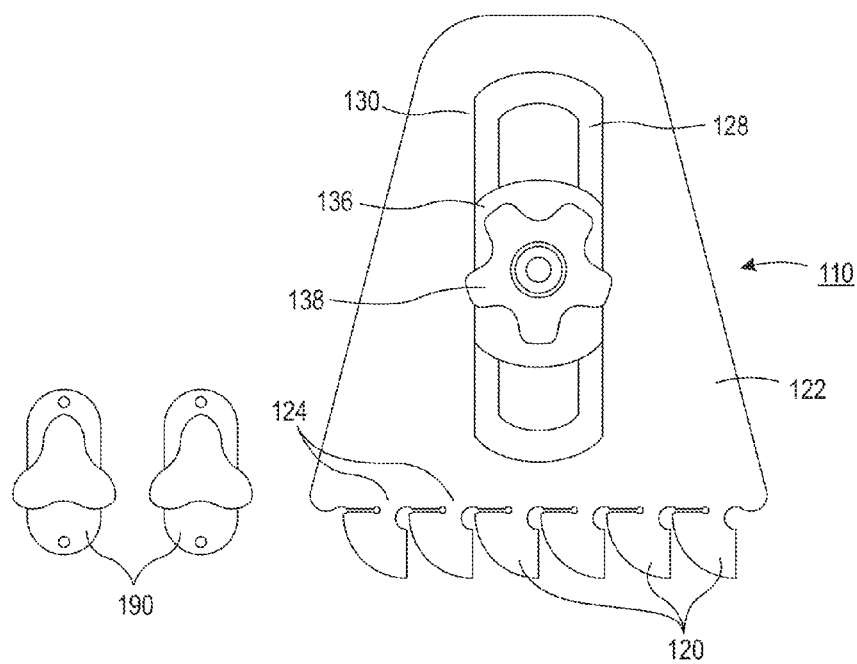
FIGS. 5-10 are representative illustrations of an embodiment of the anti-kickback device having flexible members only attached to a base, absent a support frame.

As seen in FIGS. 5-9 an alternative embodiment of anti-kickback device 100 employs support frame 134 by placing cutout 130 directly within body 122. As shown in FIG. 5, an exemplary embodiment of anti-kickback device 110 includes a flexible member body 122, a clamping arrangement comprising insert 128, backing plate 138, treaded/tapered member 214, threaded/slotted slide bar 210 and knob 136. In an alternative embodiment, clamping members such as cam-shaped levers and alternative hardware (e.g., threaded holes, T-slot channels) may be employed to releasably attach the devices to work surfaces.

Figure 6:
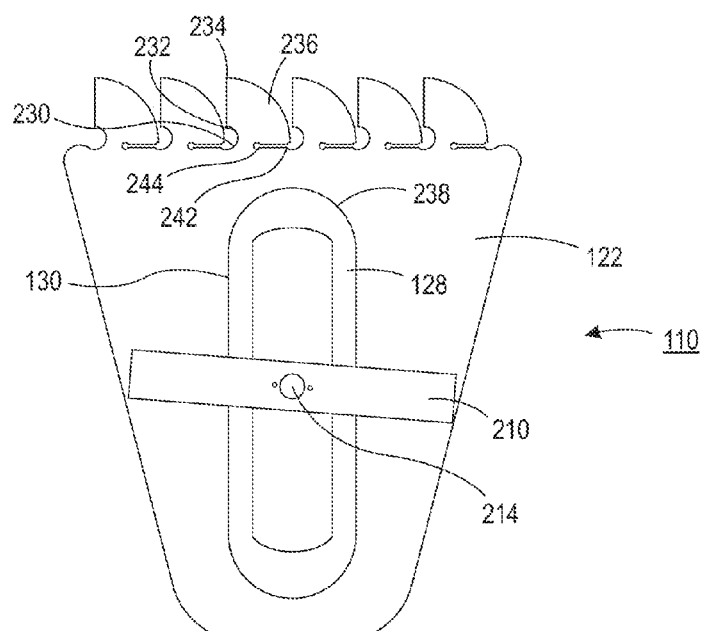
Figure 7:
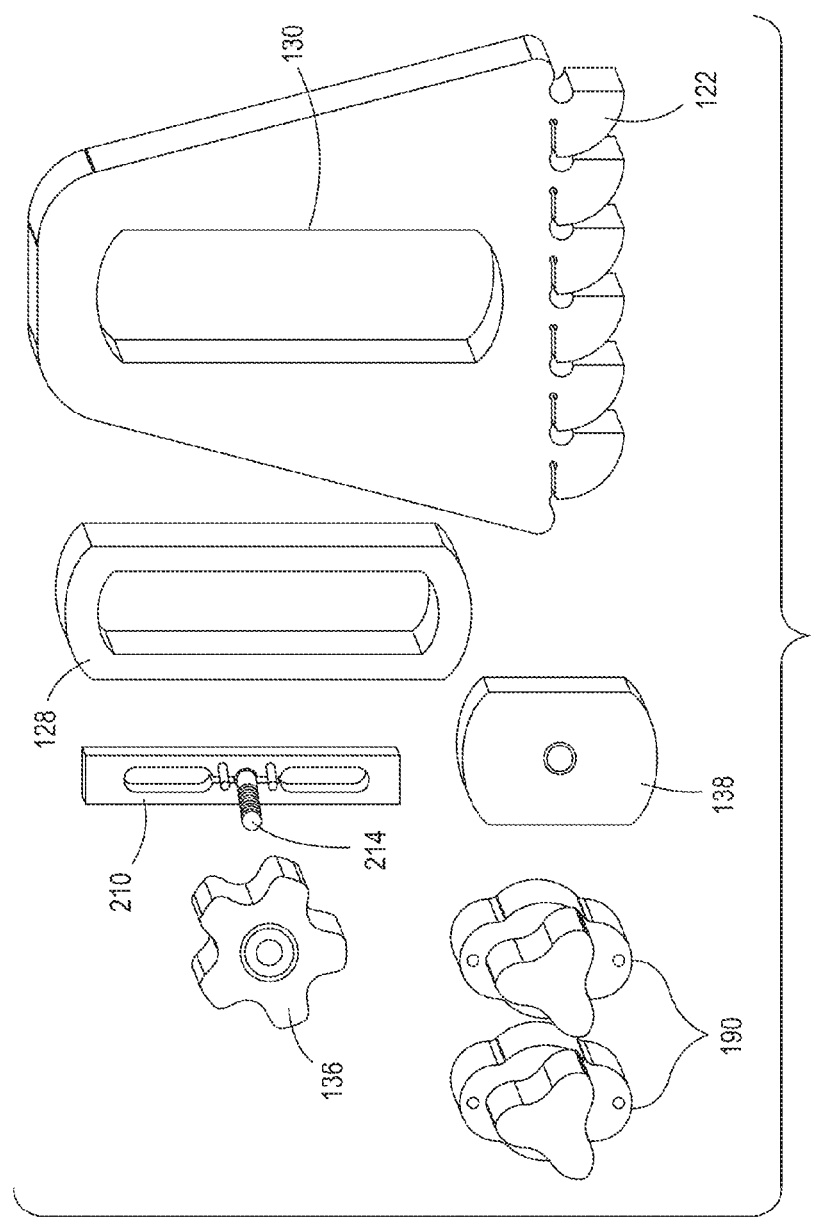

Also considering the embodiment of FIGS. 5-7 the anti-kickback device 110 includes a plurality of flexible members 120 attached to the body 122 via living hinge 124 formed of the same materials as the member and body. In one embodiment an ethylene vinyl acetate (EVA) foam is used for the body and members of the anti-kickback device, whereas the insert 128 is formed of a more rigid material such as a molded plastic or formed metal. It will be appreciated that alternative foams, such as urethane-based compositions or other materials, may be employed for the body, the flexible members or any coatings thereon. The intent is that the material from which the body and fingers are formed is able to provide a rigid, although flexible and conformable contact with a workpiece, and preferably does not mar or damage the workpiece.

In the embodiments of FIGS. 5-10 an elongated cutout region 130 within the anti-kickback device 110 is of a size and shape to receiving a similarly shaped rigid liner 128, where the rigid liner is of a size and configuration suitable for fitting within cutout 130 and receiving a fastener in order to form an adjustment mechanism to secure the anti-kickback device to a work surface.

Figure 8:
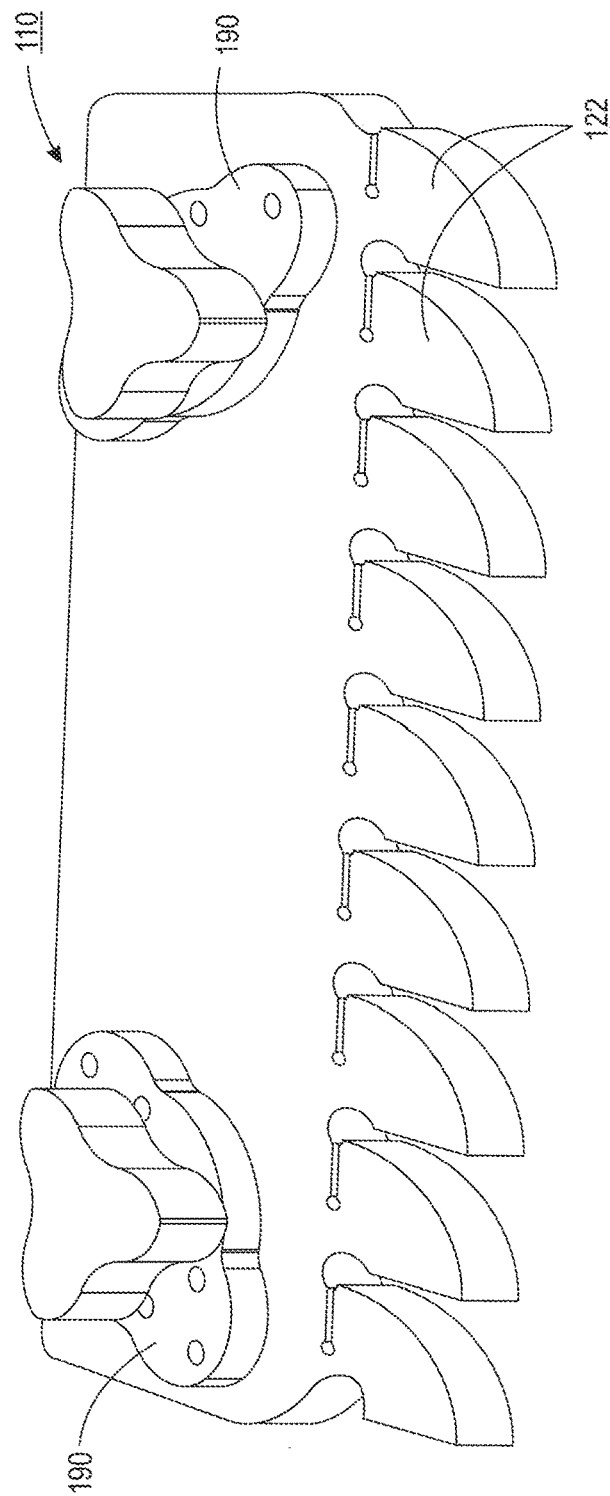

Also illustrated in FIGS. 5, 7 and 8 depict alternative components that may be employed as part of or with the anti-kickback device 110 locking and attachment mechanism. Specifically, magnetic switches 190 are intended to be used as an alternative to the slide bar, bolt and knob combination and may be placed directly into the opposite ends of the central slot of insert 128, and upon activation the magnets will firmly hold the insert and associated flexible member assembly 132 in most any position on the work surface, independent of a slot. The switches are sold by MagSwitch in various configurations (e.g., MagFixture 150). Accordingly, the adjustment mechanism, in the alternative embodiments of FIGS. 5, 7-9 and 11-13, includes a knob, or hand-actuated cam locking mechanism, (not shown) within the body to removably attach the anti-kickback device to the work surface and/or fence.

Referring briefly to FIG. 8, a similar alternative embodiment for the anti-kickback device 110 is illustrated, where the body 120 has a plurality of flexible members or teeth, and where magnetic locking devices are inserted having frictional contact with holes in the body and extend through the body such that the locking devices are able to establish a magnetic contact with a work surface and hold the anti-kickback device 110 in place most anywhere along the work surface, independent of channel 423

Figure 9:
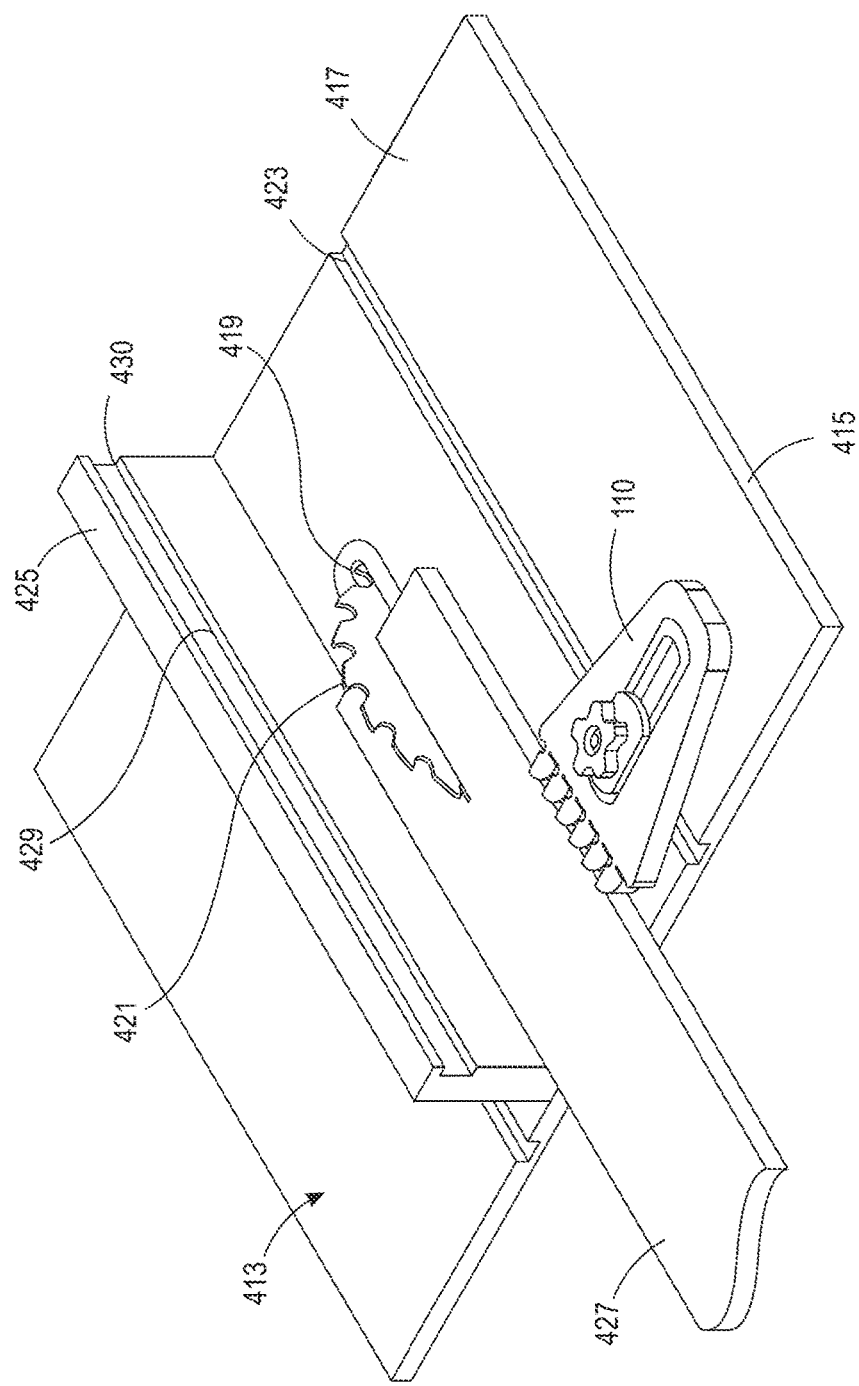

Referring to FIG. 9, anti-kickback device 110, in accordance with the disclosed embodiments, is illustrated in use on a conventional table saw. The device assembly is generally indicated at 110 attached to a work surface or table 413. The work surface is depicted as a table of a table saw, including a table 415 having a surface 417, an opening 419 in the table permits a rotating tool such as a saw blade 421 to extend through the opening. A channel 423 in the table, which may be an inverted T-shaped channel, permits the insertion and locking of tools and components such as the anti-kickback device 110. Fence 425 is positioned on the surface 417 of the table 415. In an alternative configuration, the anti-kickback device 110 may also be attached to fence 425, which has a similar channel 429 extending along the length of the fence. The channel 429 receives the corresponding locking slide of the anti-kickback device 100 or 110 apparatus in a manner similar to channel 423. In particular, as indicated in FIG. 7, the locking and adjustment mechanism may include one or more rectangular slide bars 210, held in place by a force created via a threaded bolt 214 having a conical shaft in combination with a knob, or similar internally threaded member 136 suitable for drawing the screw and slide bar toward anti-kickback device 110 and backing plate 138, thereby causing the slide bar to expand and be in frictional contact with the shoulders of channel 423 and/or channel 429.

In combination, the anti-kickback device 110 and fence 425 operate to guide workpiece 427 being pushed by an operator into blade 421 so that the stock is cut or modified as it is moved across surface 417. It will be appreciated that device 110 can be used with other work surfaces 417 such as shaper tables without altering the scope of the disclosed embodiments.

Figure 10:
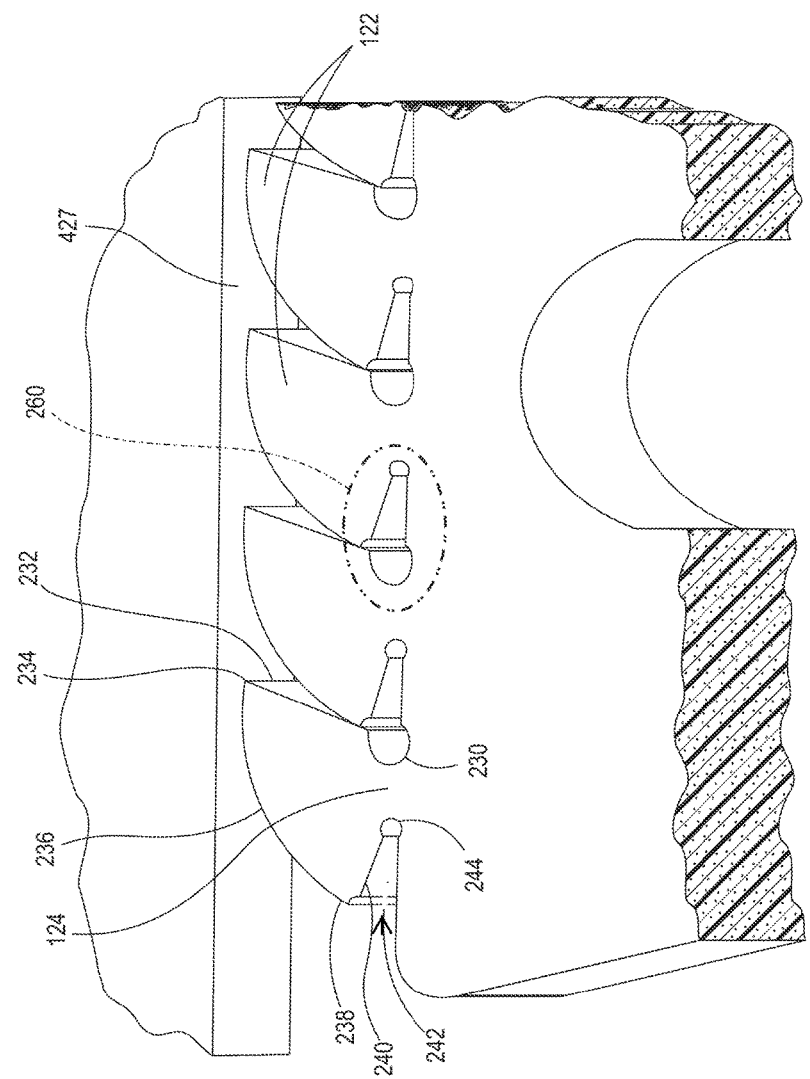
Figure 11:
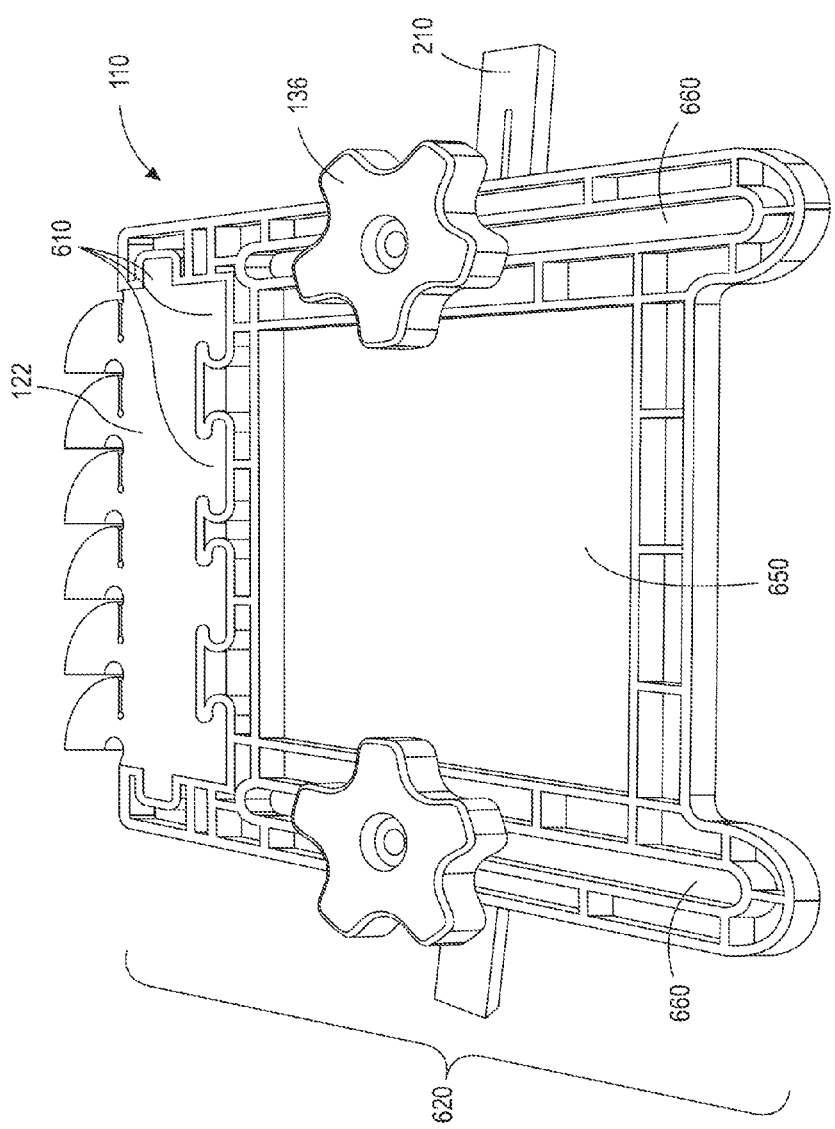
FIGS. 11-15 are representative illustrations of an embodiment of the anti-kickback device with a support frame that provides for removal and replacement of the flexible member body.
Figure 12:
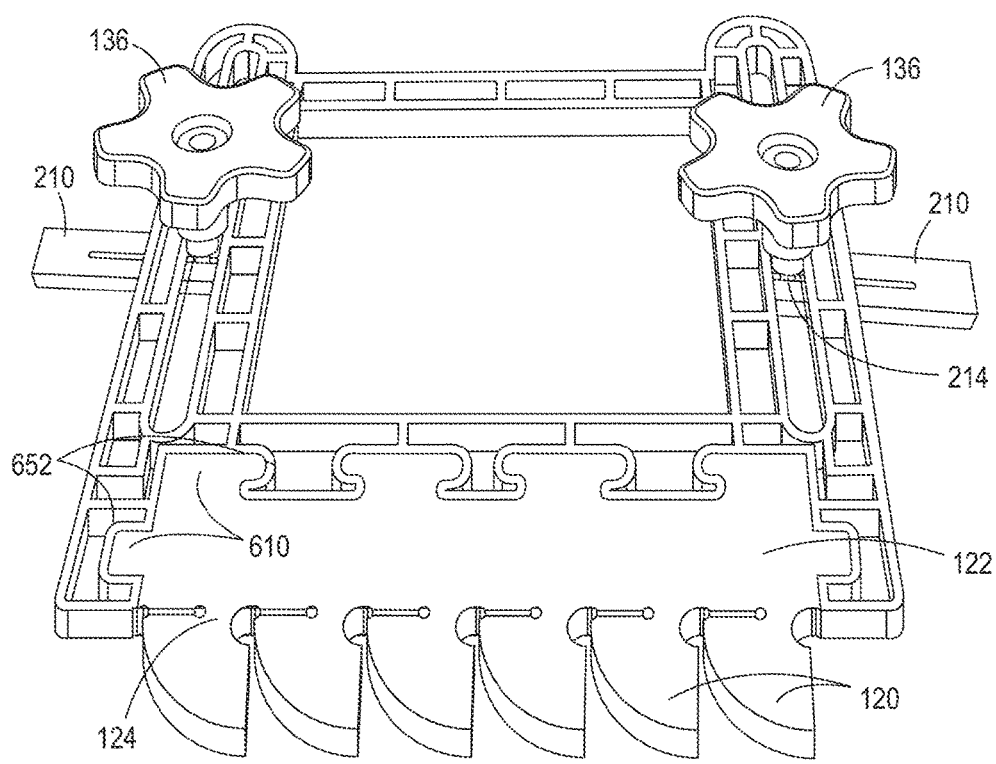
Figure 13:
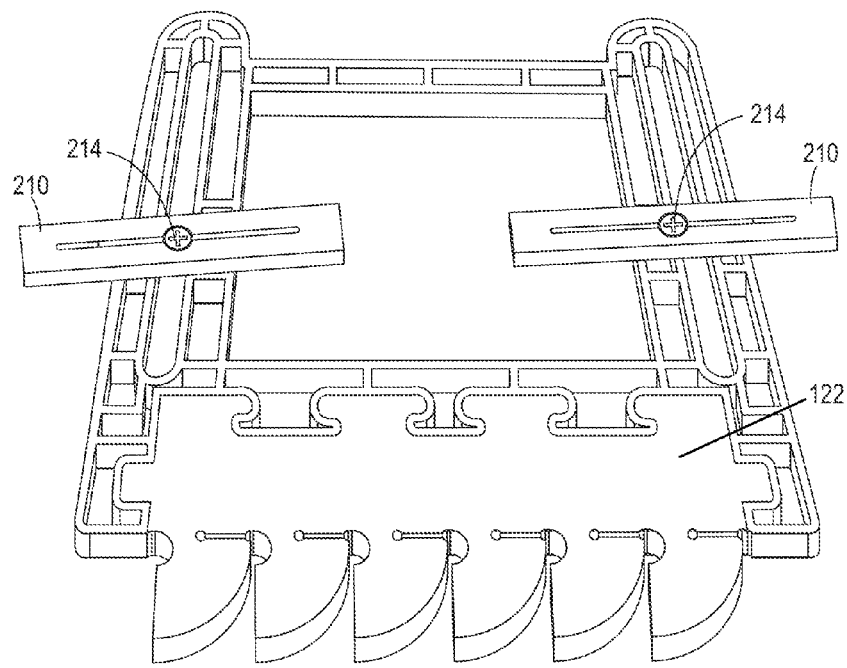

Referring now to FIG. 10, depicted therein is a close-up view of the flexible member profile of the anti-kickback device 110 in contact with a workpiece 427. More specifically, when living hinge 124 is in a flexed position, caused by arcuate surface 236 being in contact with workpiece 427, the slot 242 and adjacent recesses 230 and 244, form an elliptical shaped opening 260 between the living hinge portions of adjacent members (teeth). It should be noted that when a kick back force is exerted on workpiece 425 slot 242 closes down and limits the displacement of the flexible member as surface 240 comes in contact with the body. Each of the plurality of flexible members 120 is of a shape comprising a generally planar surface 232 extending from a first radiused recess 230 adjacent body 122. The member then transitions at tip 234 to an arcuate surface 236 where the line of intersection of surfaces defines the distal tip of member 120. Arcuate surface 236 terminates at the opposite end along an abrupt corner 238, which is formed along a line intersecting a planar surface 240 of slot 242. A second radiused recess 244 is found at the opposite end of the slot, and the space between the second radiused recess and the first radiused recess defines a living hinge portion 124 that connects the tooth to the body. In particular, the living hinge portion 124 comprises, for each member or tooth, a reduced cross-section of the material than that from which the body and teeth are made.

Considering now the second exemplary embodiments illustrated in FIGS. 11-15, the interconnecting region of device 100 includes one or more complementary interlocking features 610 extending from at least one side other than the flexible member side. The interlocking features 610 on the body provide mating features that dovetail with contrasting features on support frame 650. Accordingly, support frame 650 of the anti-kickback device 100 includes mating feature(s) that interlock with contrasting features on body 122. The insert may be further secured in place using a suitable adhesive or may remain in a frictional, but yet removable fit.

In the depicted embodiment of FIGS. 11-13 and 24, the adjustment and mounting mechanism 620 includes a molded plastic or metal support frame 650 having not only mating features (610, 652), but also one or more adjustment slots 660 through which a threaded bolt 214 may pass in order to provide the ability to attach the anti-kickback device 100 to a work surface in the manner previously disclosed above relative to the first embodiment in FIGS. 5-10. As illustrated in the alternative body embodiment of FIG. 24, for example, body (122a, 122b) may have the flexible members 120 connected in different or alternative configurations for the living hinge region 124, thereby allowing for not only the substitution and replacement of the body, but where alternative hinge region designs facilitate variations in the "sensitivity" of the anti-kickback device. As another alternative, the ability to replace the body 122 further permits the shaping of the ends or tips of the flexible members to improve contacts with workpieces that have a shaped or irregular profile (e.g., moldings). In such a configuration, the conforming EVA foam material, along with a pre-shaped surface, would assure appropriate contact between the flexible members and the work surface and would improve resistance to kickback of shaped work surfaces (e.g., post-shaping).

Figure 14:
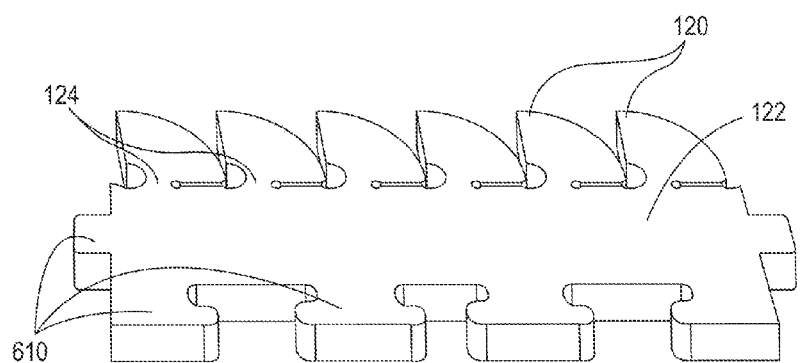
Figure 15:
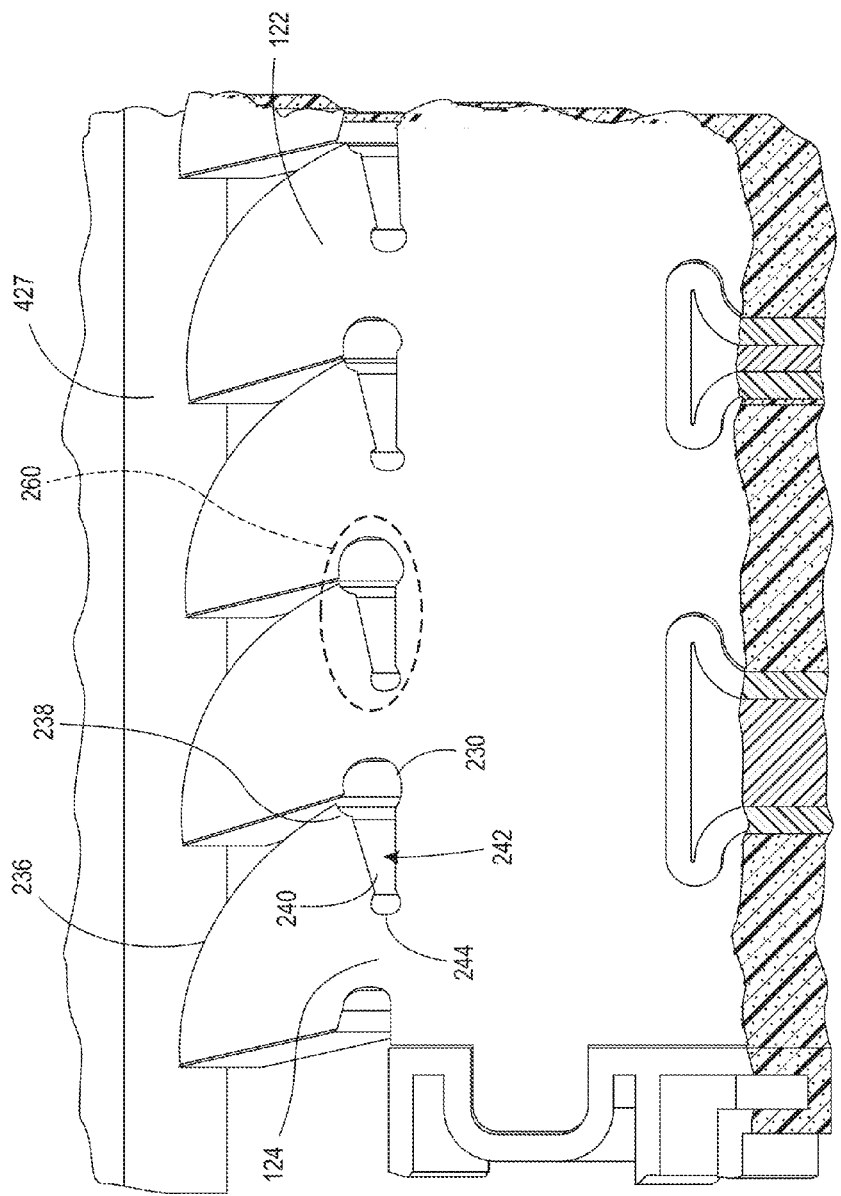

Both FIGS. 14 and 15 further illustrate the features of a plurality of flexible members 120 essentially connected to body 122 via a living hinge 124. As previously discussed the profile of the flexible member, in combination with a specific material, provides for a significantly improved reactive force in response to the kick back energy of a workpiece.

Figure 16:
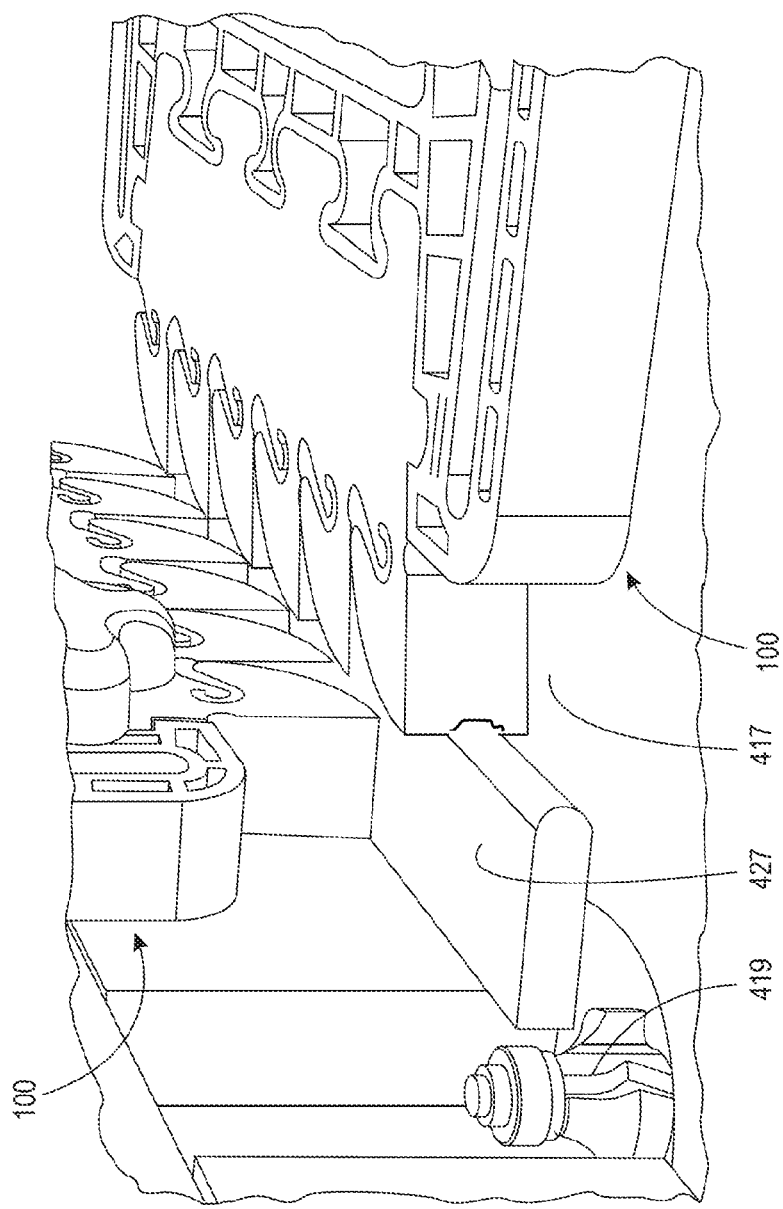
FIG. 16 illustrates two anti-kickback devices used in combination in a vertical and horizontal arrangement.

Referring next to FIG. 16 at least two anti-kickback devices 100 or 110 are engaged to afford a combination of both a horizontal and vertical force to further avert the potential for a kickback occurrence. Furthermore, workpiece chatter is significantly subsided by providing a continuous damping force onto the workpiece 427 by the flexible members of one or more devices 100. In particular when the workpiece is sufficiently thin, only a portion of flexible member 120 is compressed whereby the remaining area has a tendency to overlay the upper surface of the workpiece, which further serves to stabilize the workpiece. Also contemplated is an embodiment where in a combination of devices 100, the different devices are formed with fingers having different characteristics (e.g., flexible hinges of different strengths) so as to provide "heavy" or "light" resistance to an advancing workpiece. In the stackable configuration (FIGS. 17A, 17B) or when mounted to different work surfaces as depicted in FIG. 16 (tables, fences, etc.), the combination of anti-kickback devices can reliably bias the workpiece and resist kickback.

Figure 17A:
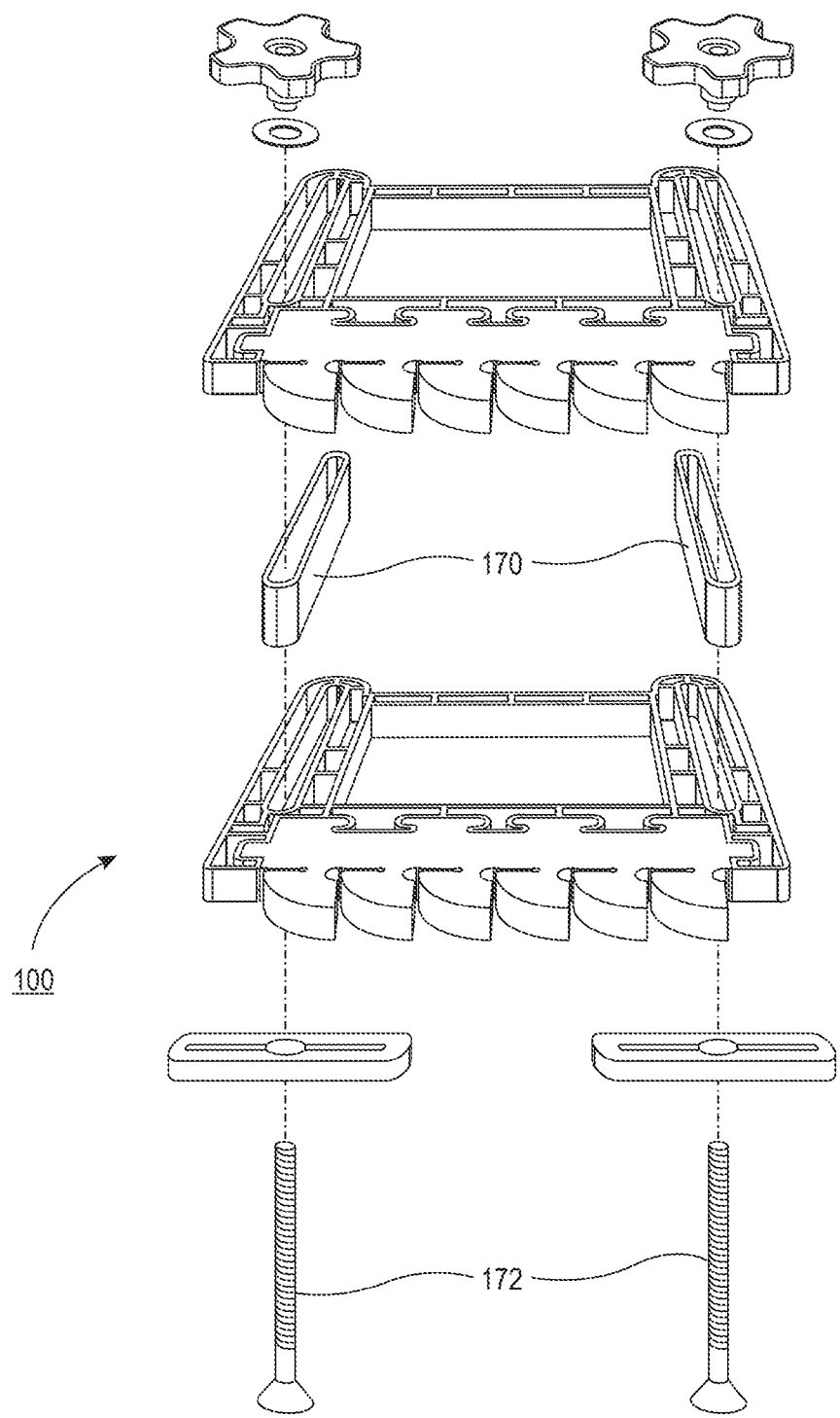
FIGS. 17A and 17B provide exploded views of two anti-kickback devices in a stacked configuration, respectively with and without spacers between the devices.
Figure 17B:
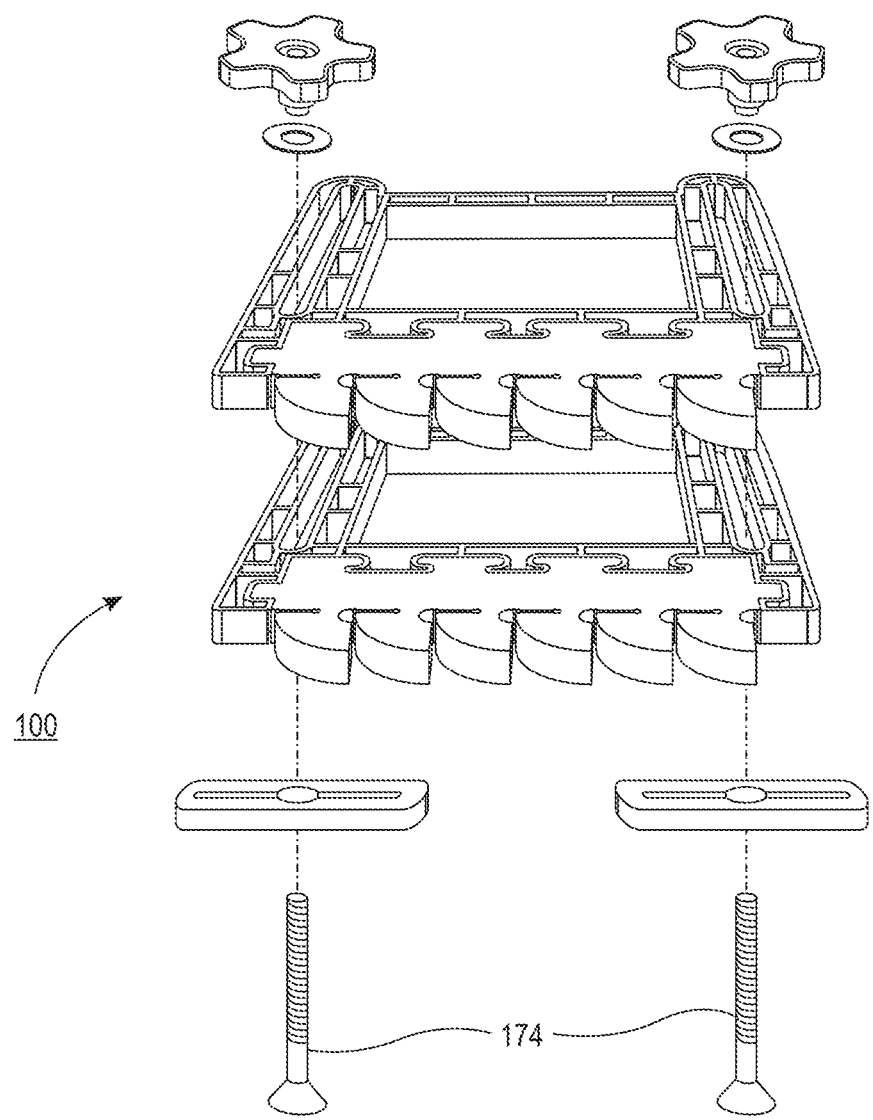

As best shown in FIGS. 17A and 17B two or more anti-kickback devices are essentially stacked one onto another to increase the vertical working height and thereby provide additional surface area to accommodate a work piece having a thickness greater than the height of a single device. Spacers 170 are inserted between a pair of devices 100 and secured one to another via extended mounting bolt 172, and optionally by pins or similar protrusions intended to interlock with features of the support frames for each device. In the alternative, two or more devices can be directly stacked on top of one another as seen in FIG. 17B, having a mounting bolt 174 of sufficient length to accommodate the additional two or more device(s).

Further disclosed in embodiments herein is an improvement to a traditional feather board as illustrated in FIGS. 18-21. In embodiments similar to those disclosed above, the modified devices are intended for use on a work surface and in a similar manner to the embodiments above each includes a plurality of flexible members such as fingers 36 extending angularly therefrom. However, the fingers are formed from or include a conformable, friction-increasing material 60 thereon.

Figure 18:
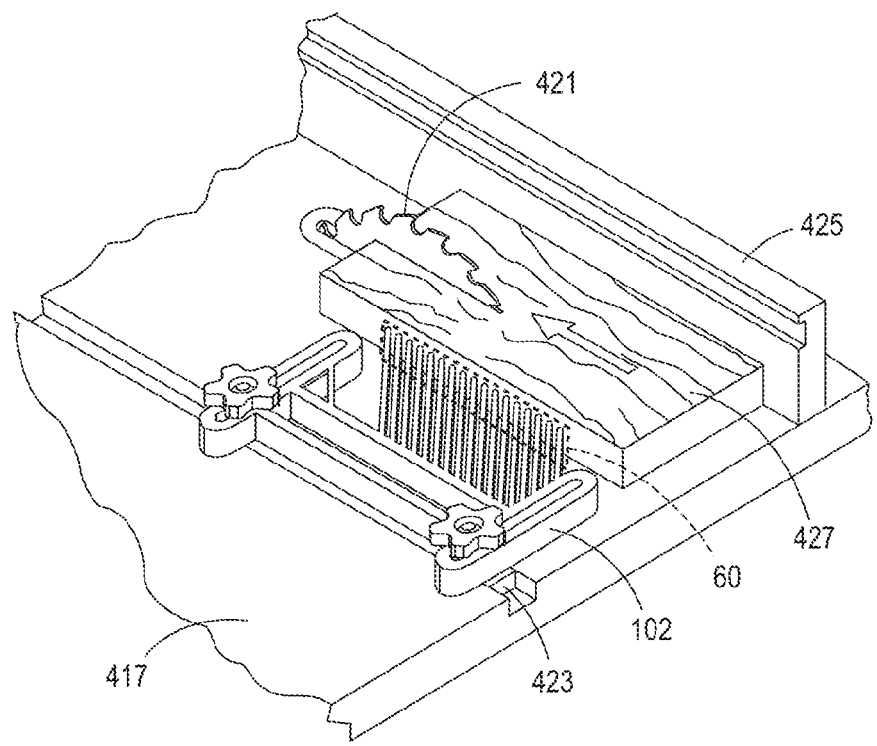
FIGS. 18-21 are illustrations of alternative embodiments of the anti-kickback device.

Referring to FIG. 18, depicted therein is a feather board 102, which is adapted to be mounted to work table 417 of a table saw. While described relative to a saw table, it will be appreciated that the anti-kickback device such as feather board 102 may also be employed with other woodworking devices such as joiners, shapers and the like. The work surface, such as saw table 417, includes channel 423 which extends longitudinally across the table and parallel to blade 421. The table saw also includes a rip fence 425 that is secured to the saw table by clamps or similar devices.

The feather board 102 includes a body having transverse slots for mounting to the saw table. Body 28 includes a plurality of angularly extending, flexible fingers 36, protruding from the longitudinal portion 30 between the sides having adjustment slot 34. The fingers 36 preferably make an angle with the longitudinal portion of less than 90°. Feather board 102 includes an expansion bar, as previously discussed, which is positioned beneath the body and sets within groove 423 on the saw table 427. As further illustrated in FIGS. 19 and 20, feather board 102 includes a plurality of parallel elongated flexible fingers 36 extending angularly from body 28, where in region 60 the fingers may have an associated friction-increasing and/or compliant material applied. Flexible fingers 36 may, in one embodiment, be encapsulated at the tips with a silicone-based material. For example, the silicone-based material may include an expandable silicone covering or tubing material 70 that is stretched and applied over at least the ends of some or all of the fingers. The covering may extend the entire length of the fingers or may be applied just adjacent the tips of the fingers 36. Moreover, it is further contemplated that the covering may be replaceable or moveable so as to permit such a covering to be adjusted or replaced in the event that it is worn away or damaged.

Figure 20:
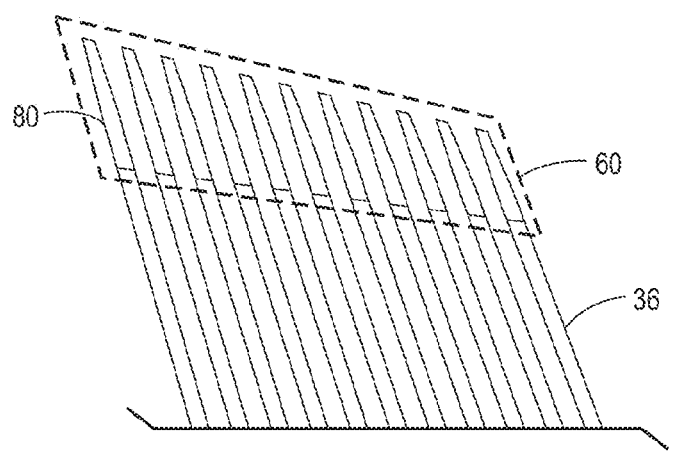

Considering FIG. 20, depicted therein is an illustration of an exemplary set of fingers 36 from a feather board, wherein the tips identified as region 60, of at least some of the fingers 36, have been treated with or dipped in a rubber compound 80. In other words, at least the ends of the fingers that are in contact with a workpiece are coated or dipped in the rubber compound. And further considering FIG. 21, the feather board 102 is further illustrated as including a friction-increasing material such as an EVA filler 90 applied between, and possibly extending slightly beyond the tips of fingers 36. It will be appreciated that the filler 90 may be affixed to the fingers or near the base using a suitable adhesive. As illustrated, the filler may not need to be applied between each set of adjacent fingers, but may be interspersed between every-other pair of fingers, for example.

Figure 19:
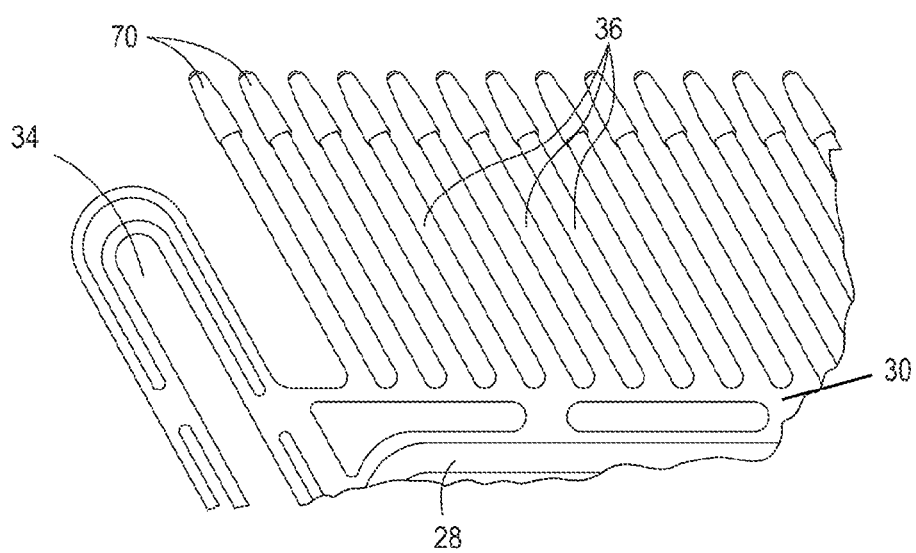
Figure 21:
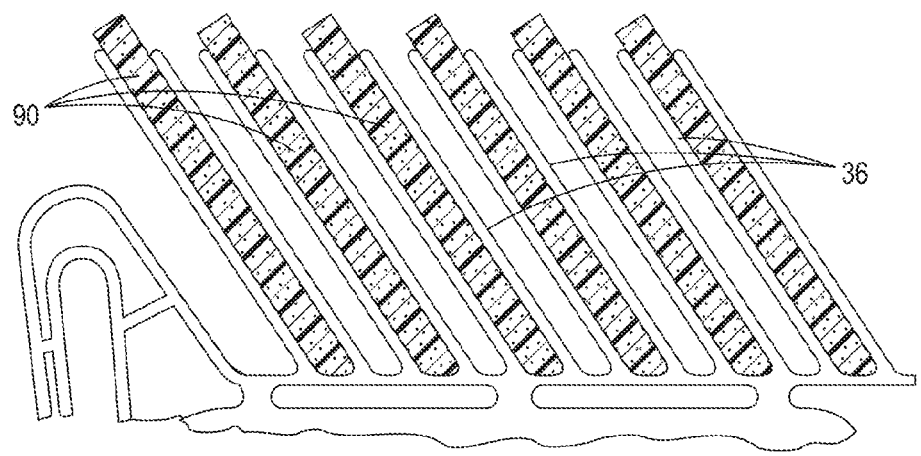

Also contemplated is the use of one or more of the embodiments illustrated, for example, in FIGS. 19-21 in combination with the other embodiments related to work-contacting devices to facilitate increasing the friction force, particularly in relation to preventing kickback of a workpiece.

In summary, the embodiments disclosed herein illustrate an anti-kickback device including a body and a plurality of flexible members extending from at least one side of the body wherein the outer shape of each of the plurality of flexible members (teeth) includes a generally planar surface extending from a first radiused recess adjacent the body, an arcuate surface, terminating at both ends thereof in a line intersecting a planar surface. A second radiused recess having a slot extending therefrom, and a living hinge portion spanning the distance between the first and second radiused recesses connects the tooth to the body, the living hinge being a living hinge and preferably formed from the same material as the teeth and body. The body is attached to or further includes a releasable adjustment mechanism for releasably attaching the anti-kickback device to a stationary surface such as a work table.

Figure 22:
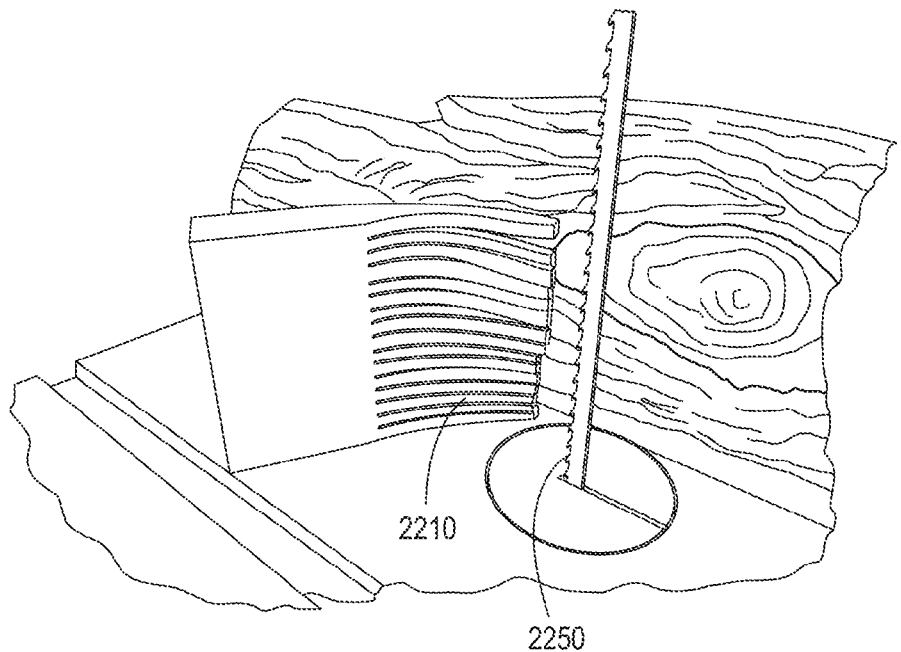
FIGS. 22 and 23 are illustrations of two alternative devices used in accordance with a band saw embodiment.
Figure 23:
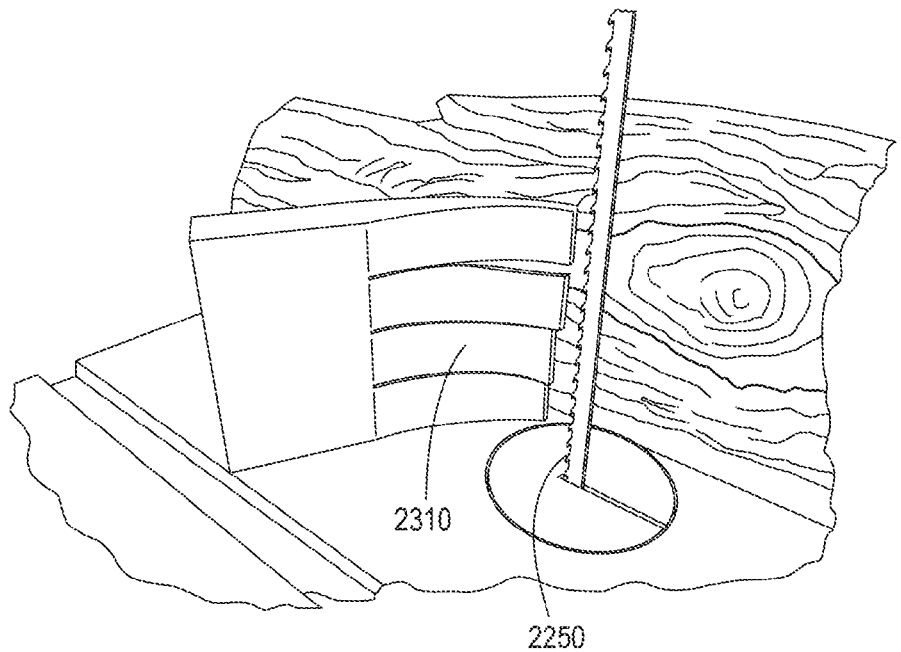

Briefly referring to FIGS. 22 and 23, depicted therein are alternative configurations of the disclosed device, where the flexible members of each embodiment are not employed so much for anti-kickback but to provide a biasing force against a fence or similar structure. The advantage of such embodiments is that the device can be position so as to apply the biasing force near the blade—at a position that would be unsafe for a user's hands. In both embodiments, one or more rows of flexible members 2210 or 2310 are in contact with the workpiece and due to the flexible nature and separation of the members, they both deflect as well as conform to the surface of the workpiece as it is being advanced toward a blade 2250 such as on a band saw. As will be appreciated from a review of the flexible members in FIG. 22, the members are formed from the base material and are cut to produce one or more parallel rows of flexible members.

EXPERIMENTAL AND COMPARATIVE TESTING

The following experiment(s) were conducted to evaluate the performance of the anti-kickback device tooth design disclosed herein, in particular the amount of opposing force that the teeth provide to resist kickback. While the tooth design of FIG. 14 was used for testing purposes, it should be understood that a similar design having approximately six teeth, as illustrated in the figure, would be expected to have similar results under the same testing conditions.

Experiment 1 a table saw configuration as generally illustrated in FIG. 10 was used with an anti-kickback device. Specifically, the anti-kickback device embodiment illustrated in FIG. 16 was employed and placed in contact with an edge of the workpiece. The workpiece was then pulled in the direction opposite the normal sawing direction using a digital scale to measure and record the maximum force applied before the workpiece started to slip relative to the anti-kickback device 100. The measured force applied to the workpiece was over 96 lbs. when the workpiece started to slip backward against the anti-kickback device.

To provide a contrasting measurement, a feather board by Mag-Tools (30 mm), including approximately thirteen angled "feathers" in contact with the workpiece was tested in a similar manner. The reverse pulling force needed to cause the same workpiece to slip against the feather board was less than approx. 15 lbs. Accordingly, it appears that the design of the flexible members in accordance with the disclosed embodiments produces a greater resistance to movement of the workpiece than conventional featherboards.

Experiment 2

In a similar configuration to FIG. 16, a workpiece was placed into position against the table saw fence and was once again engaged by the respective anti-kickback device 100. The table saw blade was set to a depth where if would not cut through the workpiece, but, as advanced a cut would be placed in approximately one-half the workpiece thickness. This configuration was believed to provide the worst-case loading of the blade without adding additional force above the height of the anti-kickback device.

When a workpiece was engaged by the anti-kickback device, the workpiece could be advanced into contact with the saw blade and no kick-back occurred. In one trial, the workpiece was raised above the sawblade and forced down onto the blade to be cut, and no kick-back occurred.

When a workpiece engaged by the competitive feather board was advanced, to be cut by the blade, the workpiece was released by the operator and the workpiece was kicked back by the saw blade.

In conclusion, based upon the experiments conducted, it appears that the design and materials of the disclosed embodiment provide a level of resistance to the kick-back of a workpiece in contact with the ends of the flexible members that of conventional feather board device employing a series of parallel "feathers".

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. A compliant anti-kickback system for biasing a workpiece, comprising:
   a support frame removably attachable to a machine work surface, said support frame including at least one feature for securing a flexible and compliant attachment thereto;
   said attachment including a body and a plurality of elongated flexible members extending from the body, wherein each of said plurality of flexible members includes a generally planar surface extending from a first radiused recess adjacent the body, an arcuate surface terminating at one end thereof in a line intersecting the planar surface, a second radiused recess at an opposite end of the arcuate surface, the second radiused recess having a slot extending therefrom, and a living hinge portion, connecting the flexible member to the body, the living hinge being located between an end of the slot and the first radiused recess.

2. The compliant anti-kickback system of claim 1 wherein each of the elongated flexible members is angled away from a direction of feed of the workpiece.

3. The compliant anti-kickback system of claim 1 wherein said hinge is a living hinge.

4. The compliant anti-kickback system according to claim 1, wherein said body and flexible members are made from a flexible ethylene vinyl acetate material.

5. The compliant anti-kickback system according to claim 1, and where said living hinge further comprises, for each flexible member, a reduced cross-section of the same material from which the body and teeth are comprised of.

6. The compliant anti-kickback system of claim 1, wherein said living hinge includes a limiter formed into the profile to restrict the angular motion of the flexible member.

7. A compliant anti-kickback system for biasing a workpiece, comprising:
   a support frame removably attachable to a machine work surface, said support frame including at least one feature for securing a flexible and compliant attachment thereto;
   said attachment including a body and a plurality of elongated flexible members extending from the wherein said body and said flexible members are made from a foam material, and where each flexible member is attached to the body at a reduced cross-sectional area from a cross section of the flexible member.

8. A compliant anti-kickback system for biasing a workpiece, comprising:
   a support frame removably attachable to a machine work surface, said support frame including at least one feature for securing a flexible and compliant attachment thereto;
   said attachment including a body and a plurality of elongated flexible members extending from the body, wherein said body includes mating features that interlock with contrasting features on said support frame.

9. The anti-kickback device according to claim 1, wherein upon contact with a workpiece a space between adjacent flexible members is created by the second radiused recess and slot, which is opened by a flexure of the living hinge, and the space is in the general shape of a keyhole.

10. An anti-kickback device, comprising:
    a body and a plurality of flexible members extending from at least one side of the body wherein the outer shape of each of the plurality of flexible members includes a generally planar surface extending from a first radiused recess adjacent the body, an arcuate surface, terminating at one end thereof in a line intersecting the planar surface, a second radiused recess at an opposite end of the arcuate surface, the second radiused recess having a slot extending therefrom, and a living hinge portion, connecting each flexible member to the body, the living hinge being located between an end of the slot and the first radiused recess; and an attachment mechanism operatively associated with the body for releasably attaching the anti-kickback device in relation to a work surface.

11. The compliant anti-kickback system of claim 1 wherein said body and said flexible members are made from a foam material, and where each flexible member is attached to the body at a reduced cross-sectional area from a cross-section of the flexible member.

12. The anti-kickback device according to claim 1, wherein said body includes mating features that interlock with contrasting features on said support frame.

* * * * *